No. 830,518. PATENTED SEPT. 11, 1906.
A. Q. NASH.
PROCESS OF MIXING INGREDIENTS.
APPLICATION FILED FEB. 27, 1904.
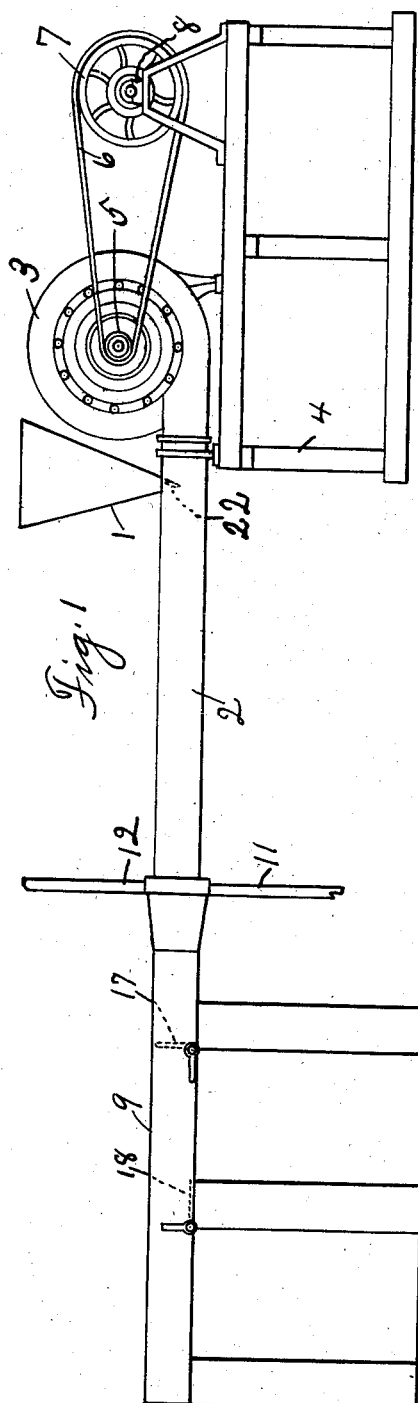
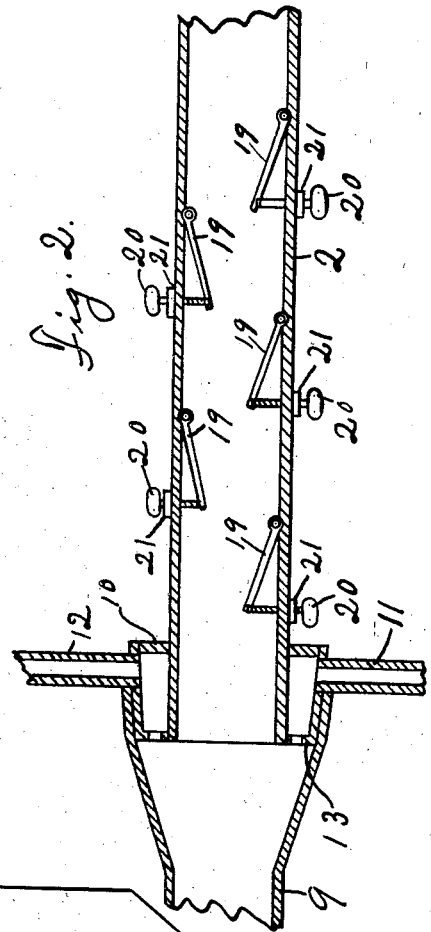
Witnesses:-
JW Stitt
D A Whisenant
Inventor,
A. Q. Nash,
By A. L. Jackson,
Attorney.

UNITED STATES PATENT OFFICE.

ALEXANDER Q. NASH, OF SHERMAN, TEXAS.

PROCESS OF MIXING INGREDIENTS.

No. 830,518.  Specification of Letters Patent.  Patented Sept. 11, 1906.

Application filed February 27, 1904. Serial No. 195,664.

*To all whom it may concern:*

Be it known that I, ALEXANDER Q. NASH, a citizen of the United States, residing at Sherman, Texas, have invented a Process of Mixing Ingredients, of which the following is a specification.

This invention relates to a process of mixing ingredients, and particularly by mixing ingredients first in the dry state and afterward saturating the material to the desired degree of moisture; and the object is primarily to mix ingredients in this manner to prepare sand-lime composition for building material; but the same process will answer for mixing material and coloring-matter for making shale brick.

Other objects and advantages will be fully explained in the following description, and the invention will be more particularly pointed out in the claims.

Reference is had to the accompanying drawings, which form a part of this application.

Figure 1 is a side elevation of suitable apparatus for carrying out the objects of this invention. Fig. 2 is a broken sectional view showing a portion of the mixing-chamber and a portion of the moistening-chamber and illustrating the manner of moistening the mixed material.

Similar characters of reference are used to indicate the same parts throughout both the views.

The apparatus illustrated in the accompanying drawings will be sufficient for carrying out the objects of this invention, and the apparatus shown illustrates one way of carrying out the process.

In the drawings is shown a hopper 1, connected to a draft pipe or chamber 2, which is the dry-mixing chamber. This chamber is connected to a blast-fan 3, which is supported on a suitable frame 4. This fan may be driven by any suitable power. I show a pulley 5, mounted on the fan-shaft and driven by a belt 6, which belt is driven by a pulley 7, mounted in suitable bearings 8. The pulley 7 may be driven by any suitable power.

At the juncture of the dry chamber 2 and the margin-chamber 9 is provided means for the introduction of steam or an air-blast and water or other liquid. A moistening-chamber 10 surrounds the end of the dry chamber 2. A steam or air-blast pipe 11 communicates with the chamber 10, and a pipe 12 for water or other liquid also communicates with chamber 10. The chamber 10 has perforations 13 in one end for forcing the water and steam out of the chamber 10 in the form of spray. The mouth of the moistening-chamber 9 is flared and telescopes on the chamber 10. This construction will serve to deflect the spray toward the center of the chamber 9. The water and steam may be forced into chamber 10 with any degree of pressure desired. After the material is thus moistened it may be delivered in any one of the bins 14, 15, or 16 to be delivered to the press. Swinging doors 17 and 18 are mounted in the chamber 9, so that the passages from chamber 9 may be closed or opened at will. The door 17 is shown opening the passage to bin 14, and the door 18 is shown closing the passage to bin 15. The bin 16 stands connected with the chamber 9, so that material can pass to bin 16 when either door 17 or 18 closes the passage in chamber 9. The passage through chamber 2, if desirable, may be made tortuous for the purpose of aiding the mixing of the material by means of deflecting-vanes 19, which are hinged to the interior of the chamber 2. These vanes may be more or less deflected by setting the vanes at different angles by means of thumb-screws 20. Suitable nuts 21 are made stationary on chamber 2, and the thumb-screws or bolts 20 operate through these nuts. The side of the hopper 1 projects slightly down in the chamber 2 at 22, so that the blasts from the fan will not blow the material back up into the hopper.

Any suitable mechanism may be used to place the ingredients in the hopper in the right proportion after the ingredients have been reduced or pulverized to the proper degree of fineness. The blast-fan 3 is rotated with sufficient velocity to force the material through the chambers 2 and 9. In manufacturing building material from sand-lime composition it is desirable to coat the grains of sand with the powdered lime. As the sand falls from the hopper it will be forced through the chamber 2 by the blast; but the sand will travel slower than the powdered material or lime. This makes the opportunity for the powder to strike the grains of sand and to form a coating on the same. This operation may be accomplished in the chamber 2 either with or without the deflecting-vane 19. The vanes 19 may be necessary in some composition to cause a thorough mixing of the same. When the material is thus mixed in chamber 2 in the dry state by the blast from the fan, it passes to the mixing-chamber 9 to be saturated with water or other liquid, which is forced into the moving material in the form of spray. The moistened material will thus be still kept in motion, although it has become heavier by being moistened, the pressure of the steam and water aiding the blasts from the fan. It may be desirable to saturate the material with different kinds of solutions which may be forced in through the pipe 12. With the apparatus and with the process above described ingredients may be mixed to form brick or blocks or slabs and articles of similar composition for building purposes. The brick or block or slabs may be made from compositions of different kinds of material. After the material is saturated to the desired degree of moisture it may be delivered to suitable bins to be delivered to the presser.

The above process is accomplished readily with the apparatus herein described, the principal feature of which is the blast from the fan or blower. The blast may be created by other means than the fan or blower. The process may be carried out with any equivalent mechanism. Building material is referred to above as being prepared by this process. It is apparent that ingredients for other purposes may be mixed by the same process. The process consists in mixing the ingredients thoroughly in the dry state by means of a blast, saturating the mixed ingredients to the desired degree of moisture under pressure, and still further agitating the mixed ingredients to make the mass of material assume a uniform consistency before being pressed.

Having fully described my invention, what I claim as new, and desire to secure by Letters Patent, is—

1. The herein-described process of mixing finely-powdered and coarse ingredients consisting of mixing the ingredients in suitable proportions, treating the mixed ingredients in the dry state in a suitable chamber by means of a blast whereby the coarse material is coated with finely-powdered material, and then saturating the mixed ingredients to the desired degree of moisture.

2. The herein-described process of mixing light ingredients with heavy ingredients consisting of mixing the ingredients in suitable proportions, coating the heavy ingredients with light ingredients in the dry state by means of a blast, saturating the mixed ingredients to the desired degree of moisture, and agitating the moistened mass of material.

3. The herein-described process of mixing heavy and light ingredients consisting of mixing the ingredients in suitable proportions and of the proper degree of fineness, treating the mixed ingredients in the dry state whereby the heavier material is coated with finely-powdered material, and saturating the mixed ingredients to the desired degree of moisture.

4. The herein-described process of mixing heavy and light ingredients consisting of mixing the ingredients in suitable proportions and of the proper degree of fineness, subjecting the mixed ingredients to a blast in the dry state whereby the heavier ingredients are coated with the finely-powdered material, and saturating the mixed ingredients to the desired degree of moisture.

5. The herein-described process of mixing heavier ingredients with finely-powdered material consisting of mixing the ingredients in suitable proportions, coating the heavier ingredients with finely-powdered material in the dry state by means of a blast, and saturating the mixed ingredients to the desired degree of moisture.

6. The herein-described process of mixing coarse and finely-powdered ingredients consisting of mixing the ingredients in suitable proportions, coating the coarse ingredients with the finely-powdered ingredients in the dry state, then treating mixed material with sprays of steam and liquid under pressure to the desired degree of moisture, and agitating the moistened mass of material whereby a uniform consistency is secured.

In testimony whereof I set my hand, in the presence of two witnesses, this 24th day of February, 1904.

ALEXANDER Q. NASH.

Witnesses:
A. L. JACKSON,
J. W. STITT.